Patented Sept. 6, 1938

2,129,449

UNITED STATES PATENT OFFICE 2,129,449

FLOWABLE COMPOSITION COMPRISING A POLYVINYL FORMALDEHYDE ACETAL RESIN

Ralph H. Talbot and Bruce E. Gramkee, Rochester, N. Y., assignors, by mesne assignments, to Eastman Kodak Company, Jersey City, N. J., a corporation of New Jersey No Drawing. Application June 28, 1935, Serial No. 28,878

6 Claims. (Cl. 106—22)

This invention relates to polyvinyl acetal resins and more particularly to a composition of a matter in which a polyvinyl formaldehyde acetal resin is mixed with other substances, so that the resulting product can be advantageously used in the plastic and analogous arts, such for instance as film or sheet manufacture and varnish manufacture.

Polyvinyl formaldehyde acetal resins have been described in several British and French patents and in United States Patent 1,955,086. In general, these resins are prepared by condensing a polyvinyl alcohol, obtained by hydrolysis of a polyvinyl ester in acid or alkaline media, with formaldehyde in the presence of a mineral acid catalyst. As pointed out in British Patent 351,082, partially hydrolyzed polyvinyl esters condense with formaldehyde to give polyvinyl formaldehyde acetal resins containing a residual ester group content. As ordinarily prepared such resins also contain a substantial hydroxyl group content. However, such resins containing a small or practically no hydroxyl group content can be prepared, i. e., by reesterification.

These polyvinyl formaldehyde acetal resins, containing a substantial ester group content, have appeared to possess properties suitable for their adoption to the manufacture of films or sheets and for their application to varnish manufacture. However, it has been found that such resins, when applied to the manufacture of films or sheets, suffer from the disability of being exceedingly difficultly cured. That is, when the resin is spread into the form of a film or sheet from a flowable composition, a substantial part of the normally liquid or solvent portion of the flowable composition cannot be made to evaporate from the resin, even at elevated temperatures. For example, one of these resins when spread upon a film-forming surface from a flowable composition comprising the resin, methyl alcohol and ethylene chloride, contained about 12% of its weight of methyl alcohol and ethylene chloride, even after nine hours curing at 135° F. Of course, films made from flowable compositions such as just recited can be cured, but only by long, tedious and expensive methods.

This high solvent-retaining property of these resins for all solvents well known in the art of film or sheet manufacture from resins, coupled with their likewise high thermo-plasticity, when they contain more than a few percent by weight of solvent has precluded their practical application to the manufacture of films or sheets, particularly such films or sheets as possess the desired properties of a support for light-sensitive photographic coatings.

Now, we have found that these polyvinyl formaldehyde acetal resins, containing a substantial ester group content and usually a hydroxyl group content, can be made into flowable compositions, comprising the resin and ethyl formate, which flowable composition can be spread upon a film-forming surface and gives rise to films or sheets which are characterized by their ability to be readily cured by the usual methods known to the art. We have also found that other solvents, such as methyl alcohol, can be admixed with the ethyl formate, providing the quantity of the auxiliary solvent is not so large as to prevent adequate solution of the resin in the solvent mixture or prevent the ready curing of the resulting film or sheet. We have found the cured films or sheets made from these new flowable compositions to be permanently transparent, strong and flexible. The cured films or sheets are substantially waterproof, of comparatively low inflammability and otherwise possess the desired properties for a support for light-sensitive photographic coatings.

The object of our invention, therefore, is to provide a flowable composition which can be made into permanently transparent, strong, and flexible sheets or films of desired thinness, which are substantially water-proof, are unaffected by ordinary photographic fluids and possess the desired properties of a support for light-sensitive photographic coatings.

Polyvinyl formaldehyde acetal resins, containing a substantial ester group content, can be prepared as described in British Patent 351,082 and are known to commerce under the tradename "Formar" resins. The resins preferably contain from an appreciable, about three or five percent, ester group content to about a thirty-five percent ester group content and from about a few percent, sometimes practically zero, to about a twenty-percent hydroxyl group content. The resins containing an ester group content much greater than thirty-five percent appear to be too plastic or soft to be used in the manufacture of film or sheet. It appears to be essential that an ester group content of at least a few percent obtains, as the resin containing no ester group content appears to be too brittle to be of practical utility when cured in the form of a film or sheet.

The following examples serve to illustrate the method of preparation of these resins, but it is to be understood that our invention is not limited thereby, except as indicated by the appended claims. In preparing these resins, the less costly and readily available polyvinyl acetate is employed, although any lower fatty acid ester of a polyvinyl alcohol will suffice. The degree of polymerization of the polyvinyl ester can be varied widely. In these following examples, the parts given are by weight and the degree of polymerization of the polyvinyl ester employed is indicated by giving the viscosity in centipoises of a 10 percent solution in benzene at 25° C. as determined by an Ostwald viscosimeter.

Example 1.—2200 parts of a polyvinyl acetate (15 centipoises), 1745 parts of ethyl acetate, 1625 parts of ethyl alcohol (95%) and 738 parts of trioxymethylene were placed in a vessel equipped with a reflux condenser and a means of agitation. The contents of the vessel were brought to a temperature of 70° C. by heating with steam. 143 parts of sulfuric acid (sp. g. 1.84) dissolved in 291 parts of water were added and the whole heated at 70° C. with agitation for 7.5 hours. The contents of the vessel were neutralized with ammonium hydroxide and enough water was added to precipitate the resin. The resulting cake of resin was cut into small pieces and thoroughly washed with hot water until all the solvents and other impurities were removed. This resin showed an acetate group content equivalent to about 34.7 per cent by weight of polyvinyl acetate.

Example 2.—2200 parts of a polyvinyl acetate (15 centipoises) were treated as in Example 1, except that heating and agitation were carried out for 10.5 hours. The resin was purified as above. The purified resin showed an acetate group content equivalent to about 21.85 per cent by weight of polyvinyl acetate.

Example 3.—2200 parts of a polyvinyl acetate (15 centipoises) were treated as in Example 1, except that heating and agitation were carried out for 12.5 hours. The resin was purified as above. The purified resin showed an acetate group content equivalent to about 14.85 per cent by weight of polyvinyl acetate.

Example 4.—2200 parts of a polyvinyl acetate (15 centipoises) were treated as in Example 1, except that heating and agitation were carried out for 15 hours. The resin was purified as above. The purified resin showed an acetate group content equivalent to about 8.3 per cent by weight of polyvinyl acetate.

Example 5.—2200 parts of a polyvinyl acetate (30 centipoises) 2200 parts of ethyl acetate, 2935 parts of ethyl alcohol (95%) and 957 parts of trioxymethylene were placed in a vessel equipped with a reflux condenser and a means of agitation. The contents were brought to a temperature of 70° C. by heating with steam. One hundred forty-three parts of sulfuric acid (sp. g. 1.84) dissolved in 120 parts of water were added and the whole heated at 70° C. with agitation for 15 hours. The resin was purified as in Example 1. The purified resin showed an acetate group content equivalent to about 16.8 per cent by weight of polyvinyl acetate.

Example 6.—2000 parts of a polyvinyl acetate (45 centipoises), 2571 parts of ethyl acetate, 3429 parts of ethyl alcohol (95%) and 1116 parts of trioxymethylene were placed in a vessel equipped with a reflux condenser and a means of agitation. The contents were brought to a temperature of 70° C. by heating with steam. One hundred thirty parts of sulfuric acid (sp. g. 1.84) dissolved in 53 parts of water were added and the whole heated at 70° C. with agitation for 17 hours. The resin was purified as in Example 1. The purified resin showed an acetate group content equivalent to about 17.6 percent by weight of polyvinyl acetate.

Any of the polyvinyl formaldehyde acetal resins, containing a substantial ester group content and usually a hydroxyl group content can be made up into a flowable composition comprising the resin and ethyl formate or ethyl formate with a suitable solvent, such as methyl alcohol, which a flowable composition can be spread upon a film-forming surface and gives rise to films or sheets which can be satisfactorily cured. The following examples serve to illustrate preferred forms of these flowable compositions. It will be understood, however, that our invention is not limited thereby except as indicated by the appended claims.

Example A

| | Parts by weight |
|---|---|
| Resin from Example 2 | 100 |
| Ethyl formate | 400 |

Example B

| | |
|---|---|
| Resin from Example 3 | 100 |
| Ethyl formate | 382.5 |
| Methyl alcohol | 67.5 |

Example C

| | |
|---|---|
| Resin from Example 5 | 100 |
| Ethyl formate | 382.5 |
| Methyl alcohol | 67.5 |

Example D

| | |
|---|---|
| Resin from Example 6 | 100 |
| Ethyl formate | 382.5 |
| Methyl alcohol | 67.5 |

The flowable compositions are all prepared by dissolving the resin in the solvent, agitating and heating to effect solution, if necessary. Plasticizers, dyes or other materials intended to confer various properties upon the sheets or films may be added, if desired.

To prepare a transparent film or sheet from one of these flowable compositions, the composition is spread upon a film-forming surface, such as glass or metal plate or table or a revolving drum, facilitating the evaporation of the normally volatile portion of the composition by heating the film-forming surface by means of warm air or otherwise. The formed film or sheet is then stripped from the film-forming surface and subjected to curing by placing the stripped film or sheet in contact with warm air for a few hours, the details of the process being well known to those skilled in the art. The resulting film or sheet when cured has lost all but a few per cent of the solvents employed and is strong and flexible, being a very satisfactory material to use as a support for light-sensitive coatings.

Of the flowable compositions given above, those containing ethyl formate and methyl alcohol substantially in the proportions given in the examples are especially satisfactory. The replacement of ethyl formate with other solvents such as methyl acetate, ethyl acetate, propyl formate, ethylene chloride, etc. has been found to be unsatisfactory. While the proportions given in the examples are those which we have found to be especially useful, it is obvious that other proportions could be used with fairly satisfactory results.

What we claim and desire to be secured by Letters Patent of the United States is:

1. A flowable composition particularly adapted to the manufacture of transparent films or sheets comprising ethyl formate and a polyvinyl formaldehyde acetal resin, containing a substantial ester group content and a substantial hydroxy group content.

2. A flowable composition particularly adapted to the manufacture of transparent films or sheets comprising ethyl formate and a ployvinyl formaldehyde acetal resin, containing a substantial acetate group content and a substantial hydroxy group content.

3. A flowable composition particularly adapted to the manufacture of transparent films or sheets comprising ethyl formate and a polyvinyl formaldehyde acetal resin, containing a substantial ester group content.

4. A flowable composition particularly adapted to the manufacture of transparent films or sheets comprising ethyl formate and a polyvinyl formaldehyde acetal resin, containing a substantial acetate group content.

5. A flowable composition particularly adapted to the manufacture of transparent films or sheets comprising ethyl formate and a polyvinyl formaldehyde acetal resin, containing an acetate group content equivalent to from about five percent to about thirty-five percent by weight of polyvinyl acetate and a hydroxy group content equivalent to not greater than about twenty percent by weight of polyvinyl alcohol.

6. A flowable composition particularly adapted to the manufacture of transparent films or sheets comprising ethyl formate, methyl alcohol and a polyvinyl formaldehyde acetal resin, containing an acetate group content equivalent to from about five percent to about thirty-five percent by weight of polyvinyl acetate and a hydroxy group content equivalent to not greater than about twenty percent by weight of polyvinyl alcohol.

RALPH H. TALBOT.
BRUCE E. GRAMKEE.